(12) United States Patent
Koyama et al.

(10) Patent No.: US 9,338,415 B2
(45) Date of Patent: May 10, 2016

(54) PROJECTOR AND IMAGE DISPLAY APPARATUS

(75) Inventors: Mika Koyama, Matsumoto (JP); Tetsu Nakayama, Matsumoto (JP); Shingo Yoshida, Matsumoto (JP); Hiroto Miyauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 173 days.

(21) Appl. No.: 14/235,900

(22) PCT Filed: Aug. 2, 2012

(86) PCT No.: PCT/JP2012/004910
§ 371 (c)(1),
(2), (4) Date: Jan. 29, 2014

(87) PCT Pub. No.: WO2013/027339
PCT Pub. Date: Feb. 28, 2013

(65) Prior Publication Data
US 2014/0192332 A1 Jul. 10, 2014

(30) Foreign Application Priority Data
Aug. 23, 2011 (JP) .................................. 2011-181299

(51) Int. Cl.
*G03B 21/14* (2006.01)
*H04N 9/31* (2006.01)
(Continued)

(52) U.S. Cl.
CPC ................. *H04N 9/31* (2013.01); *F16M 11/08* (2013.01); *F16M 11/2057* (2013.01);
(Continued)

(58) Field of Classification Search
CPC .............................. G03B 21/14; G03B 21/147
USPC ................. 353/30, 69, 70, 94, 119, 121, 122; 345/2.2, 4, 5, 7, 9; 348/742, 806
See application file for complete search history.

(56) References Cited

U.S. PATENT DOCUMENTS 5,396,301 A    3/1995    Sasaki et al.
8,610,761 B2 *   12/2013    Haisty ................. H04N 9/3147
                                                                                                                    348/51

(Continued)

FOREIGN PATENT DOCUMENTS

CN           1945422 A      4/2007
JP           2005024668 A     1/2005

(Continued)

OTHER PUBLICATIONS

International Search Report issued in International Application No. PCT/JP2012/004910 dated Feb. 11, 2013.

*Primary Examiner* — William C Dowling
(74) *Attorney, Agent, or Firm* — Oliff PLC

(57) ABSTRACT

A projector (1) which projects a guide image (Pg). A first region above the center of the guide image (Pg) shows a perspective view (D) representing the projector (1) and a supporting device (2) supporting the projector (1). A second region on the upper right of the guide image (Pg), shows six illustrations (G1-G6) affixed with numbers 1 to 6. The six illustrations (G1-G6) respectively correspond to six adjustment items related to a supporting state of the projector (1). The six illustrations (G1-G6) indicate how a projected image changes when the adjustment items are adjusted. The perspective view (D) is an explanatory diagram for clearly showing the positions of adjustment operation units that adjust the six adjustment items of the supporting device (2). In the perspective view (D), the numbers 1 to 6 are affixed near the respective adjustment operation units in balloons.

7 Claims, 11 Drawing Sheets

(51) Int. Cl.
*G03B 21/28* (2006.01)
*G03B 21/54* (2006.01)
*F16M 11/08* (2006.01)
*F16M 11/20* (2006.01)
*F16M 11/24* (2006.01)
*F16M 13/02* (2006.01)

(52) U.S. Cl.
CPC ...... *F16M 11/2085* (2013.01); *F16M 11/2092* (2013.01); *F16M 11/24* (2013.01); *F16M 13/02* (2013.01); *G03B 21/145* (2013.01); *G03B 21/28* (2013.01); *G03B 21/54* (2013.01); *H04N 9/317* (2013.01)

(56) References Cited

U.S. PATENT DOCUMENTS

| | | |
|---|---|---|
| 2003/0234335 A1 | 12/2003 | Umberg |
| 2005/0264765 A1 | 12/2005 | Yang et al. |
| 2007/0052733 A1 | 3/2007 | Hirabayashi et al. |
| 2009/0161028 A1* | 6/2009 | Tanaka .............. H04N 9/3147 348/750 |
| 2010/0195064 A1* | 8/2010 | Kim .............. G03B 21/14 353/121 |
| 2010/0321646 A1 | 12/2010 | Nakano et al. |
| 2011/0169924 A1 | 7/2011 | Haisty et al. |
| 2013/0215135 A1 | 8/2013 | Hirabayashi et al. |
| 2013/0265551 A1* | 10/2013 | Yamano .............. G03B 21/14 353/30 |
| 2013/0329196 A1* | 12/2013 | Aruga .............. G03B 21/147 353/69 |
| 2014/0111536 A1* | 4/2014 | Shinozaki .............. G09G 5/37 345/589 |

FOREIGN PATENT DOCUMENTS

| | | |
|---|---|---|
| JP | 2005091642 A | 4/2005 |
| JP | 2005151310 A | 6/2005 |
| JP | 2007-127728 A | 5/2007 |
| JP | 2008242087 A | 10/2008 |
| JP | A-2011-002610 | 1/2011 |
| JP | 2011-154072 A | 8/2011 |

* cited by examiner

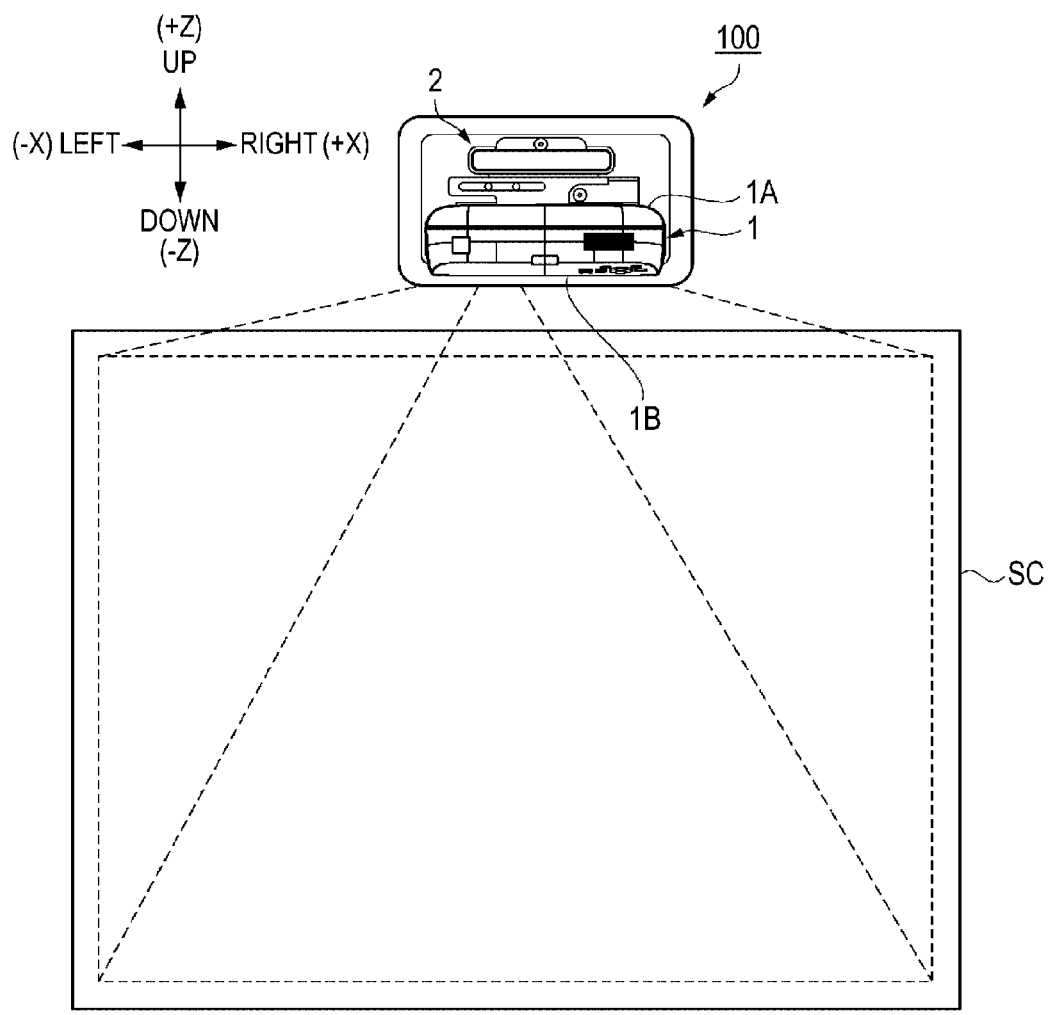
Fig. 1-A

Fig. 1-B
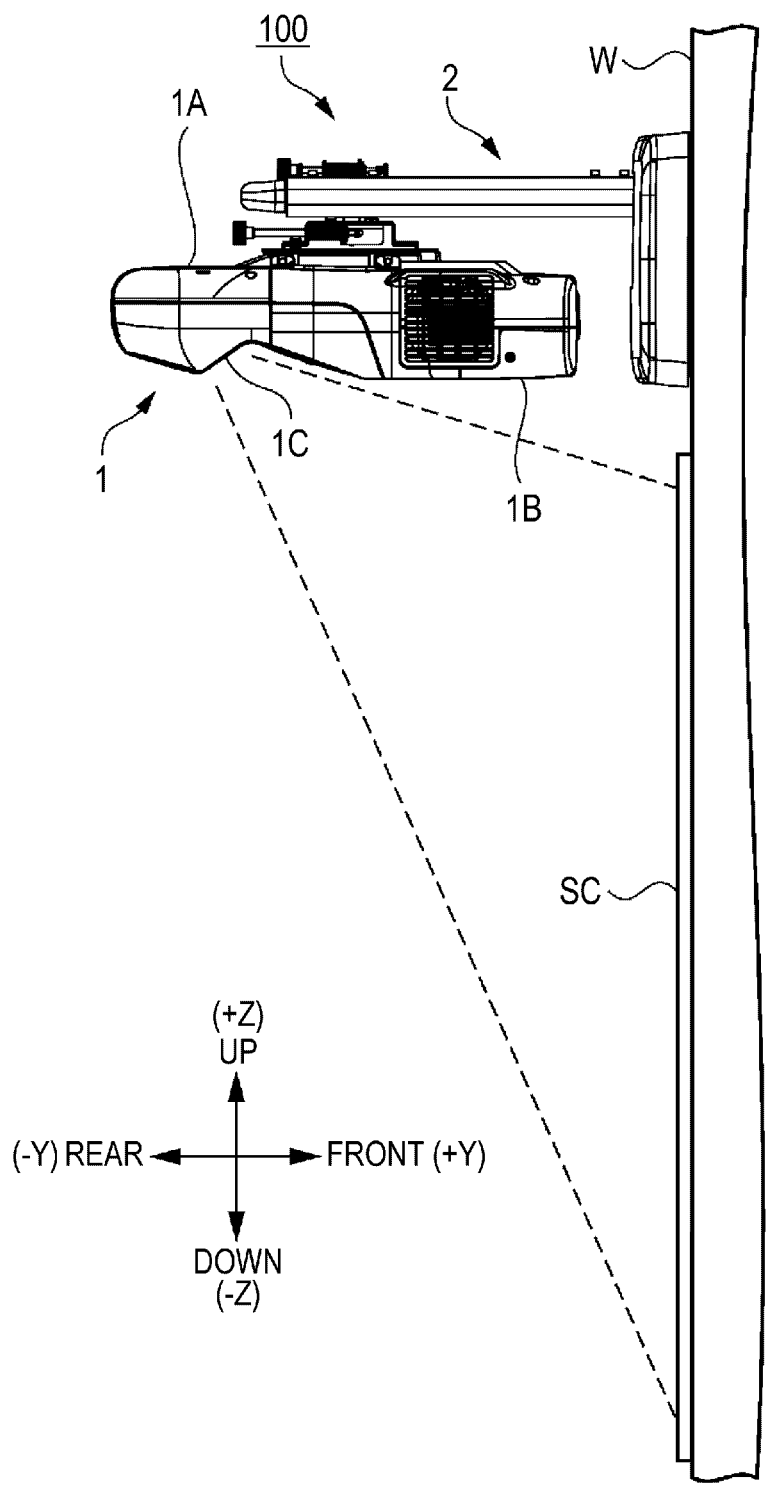

Fig. 5-A
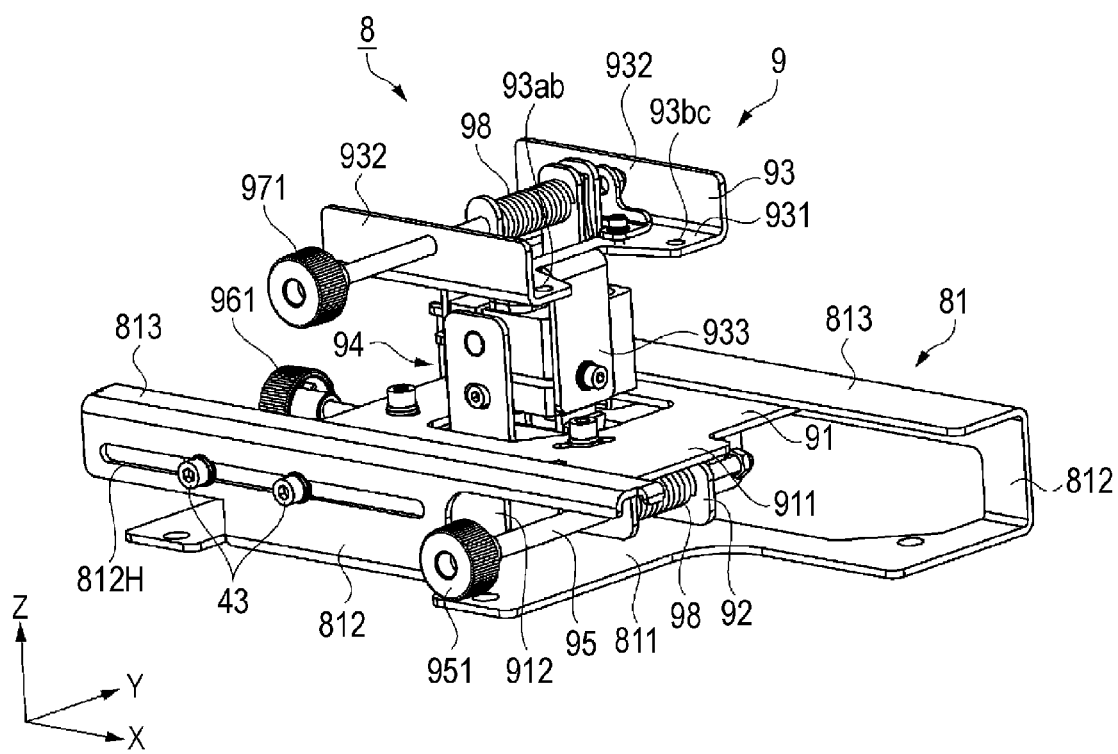

Fig. 5-B
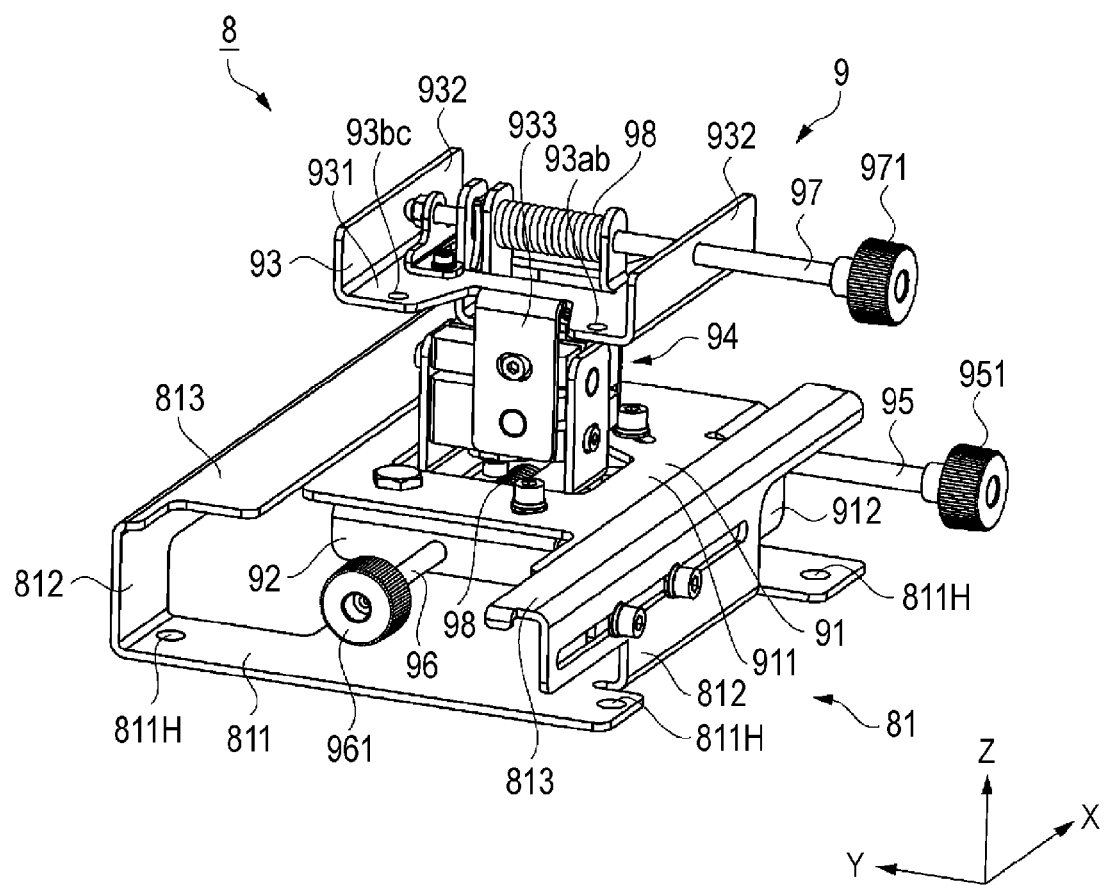

PROJECTOR AND IMAGE DISPLAY APPARATUS

TECHNICAL FIELD

The present invention relates to a projector that modulates light emitted from a light source and projects the light and an image display apparatus including the projector.

BACKGROUND ART

There is known a supporting device (a suspension device) that supports a projector, which modulates and projects light, and enables the projector to be set on a wall surface, a ceiling, or the like (see, for example, PTL 1). Such a supporting device includes an adjusting mechanism for adjusting a supporting state (the position, the tilt, etc.) of the projector. A user can adjust (correct) the position, the size, the shape, and the like of a displayed image by operating the adjusting mechanism.

CITATION LIST

Patent Literature

PTL 1: JP-A-2011-2610

SUMMARY OF INVENTION

Technical Problem

However, in the supporting device explained above, it is hard for an inexperienced user to understand the operation of the adjusting mechanism. It is not easy for the user to operate the adjusting mechanism. Therefore, the user often has to work while referring to a manual (a printed matter). As a result, the user takes time in adjusting work, i.e., setting work for the projector.

Solution to Problem

An advantage of some aspects of the invention is to solve at least a part of the problems described above, and the invention can be implemented as the following forms or application examples.

Application Example 1

This application example of the invention is directed to a projector supported by a supporting device including a plurality of adjustment operation units for adjusting a supporting state of the projector. The projector includes a projecting unit configured to project light modulated according to image information and display an image and a guide display unit configured to display a guide image for guiding the adjustment by the plurality of adjustment operation units.

With the projector, since the guide image for guiding the adjustment of the supporting state by the plurality of adjustment operation units included in the supporting device, which supports the projector, is displayed, a user can adjust the supporting state while looking at the displayed guide image and easily perform adjustment operation.

Application Example 2

In the projector of the above application example, it is preferable that the guide image includes an explanatory diagram for clearly showing the positions of the plurality of adjustment operation units.

With the projector, since the guide image includes the explanatory diagram for clearly showing the positions of the adjustment operation units, the user can easily recognize the position of the adjustment operation unit that the user should operate.

Application Example 3

In the projector of the above application example, it is preferable that the guide image includes a plurality of illustrations indicating correspondence between the plurality of adjustment operation units and a plurality of adjustment items related to the supporting state of the projector.

With the projector, since the guide image includes the plurality of illustrations indicating the correspondence between the adjustment operation units and the adjustment items, the user can easily recognize which adjustment operation unit the user should operate to adjust which adjustment item.

Application Example 4

In the projector of the above application example, it is preferable that the illustrations represent changes of a projected image that occur when the adjustment items are adjusted.

With the projector, since the illustrations representing the adjustment items represent changes of a projected image that occur when the adjustment items are adjusted, when the user performs adjustment while looking at the projected image, the user can easily recognize an adjustment item that the user should adjust.

Application Example 5

In the projector of the above application example, it is preferable that, in the guide image, signs representing order in performing the adjustment of the supporting state are affixed to both of the adjustment operation units shown in the explanatory diagram and the illustrations corresponding to the adjustment operation units.

With the projector, since the signs representing the order in performing the adjustment of the supporting state are affixed to both of the adjustment operation units in the explanatory diagram and the illustrations corresponding to the adjustment operation units, the user can easily recognize correspondence between the adjustment operation units and the illustrations and easily recognize an operation procedure for the adjustment.

Application Example 6

In the projector of the above application example, it is preferable that the guide image includes a test pattern for making it easy to recognize the supporting state of the projector.

With the projector, since the test pattern for making it easy to recognize the supporting state of the projector is included in the guide image, the user can more easily perform the adjustment of the supporting state.

Application Example 7

In the projector of the above application example, it is preferable that the projector includes a storing unit configured to store information representing whether the guide image is automatically displayed and a control unit configured to read out the information from the storing unit during startup and perform control based on the information.

With the projector, since it is possible to automatically display the guide image during startup, the user can efficiently perform the adjustment work for the supporting device.

Application Example 8

This application example of the invention is directed to an image display apparatus including the projector according to the aspect explained above and a supporting device configured to support the projector.

With the image display apparatus, it is possible to obtain effects same as the effects of the projector.

BRIEF DESCRIPTION OF DRAWINGS

FIG. 1-A is a front view showing a schematic configuration of an image display apparatus.

FIG. 1-B is a side view showing a schematic configuration of an image display apparatus.

FIG. 5-A is a diagram of a holding mechanism viewed from obliquely above on the right side.

FIG. 5-B is a diagram of the holding mechanism viewed from obliquely above on the left side.

DESCRIPTION OF EMBODIMENTS

First Embodiment

An image display apparatus according to a first embodiment is explained below with reference to the accompanying drawings.

Overall Configuration

FIGS. 1-A and 1-B are diagrams showing a schematic configuration of the image display apparatus according to this embodiment. FIG. 1-A is a front view and FIG. 1-B is a side view.

As shown in FIGS. 1-A and 1-B, an image display apparatus 100 includes a projector 1 and a supporting device 2. The projector 1 projects light on a screen SC arranged on a wall surface W and displays an image on the screen SC. The supporting device 2 is fixed to the wall surface W above the screen SC. The supporting device 2 separates the projector 1 from the wall surface W and supports the projector 1. In the following explanation, in the normal direction with respect to the wall surface W, a direction from the projector 1 side to the wall surface W is represented as a front direction (a +Y direction) and a direction away from the wall surface W is represented as a rear direction (a −Y direction). In the vertical direction, a direction against the gravity is represented as an up direction (a +Z direction) and the gravity direction is represented as a down direction (a −Z direction). On the wall surface W, a direction on the right side is represented as a right direction (a +X direction) and a direction on the left side is represented as a left direction (a −X direction).

The projector 1 is a projector of a short focus type including a concave mirror 15 (see FIG. 6) for increasing the angle of projected light. The projector 1 can project light on the screen SC from a near distance and display an image on a large screen. As shown in the figures, an upper surface 1A of the projector 1 is supported by the supporting device 2. The projector 1 projects, from a projection window 1C provided on a lower surface 1B, light to the screen SC provided on an obliquely lower side.

Configuration of the Supporting Device

Figure 2:
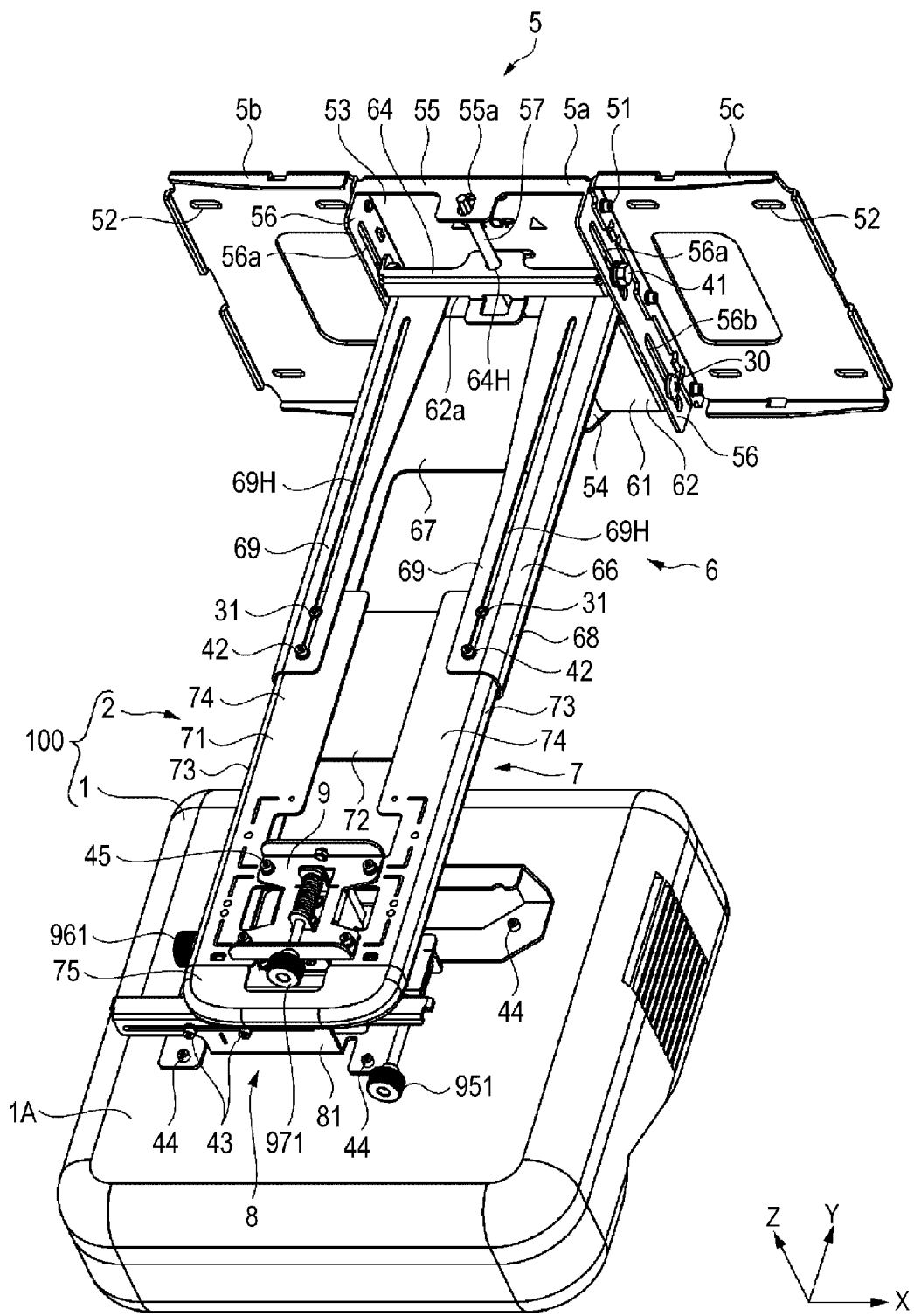
FIG. 2 is a perspective view showing a supporting device.
Figure 3:
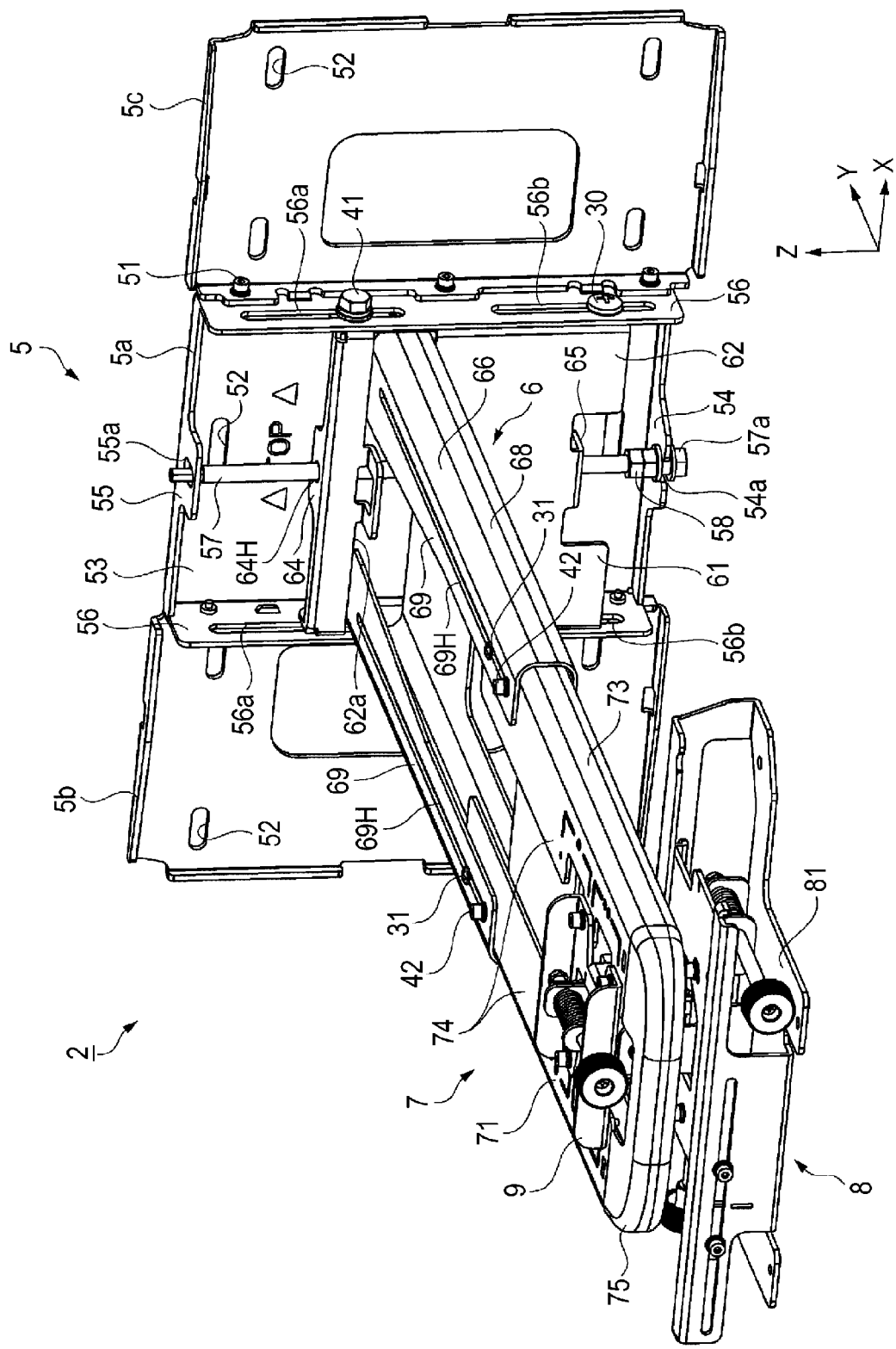
FIG. 3 is a perspective view showing the supporting device.
Figure 4:
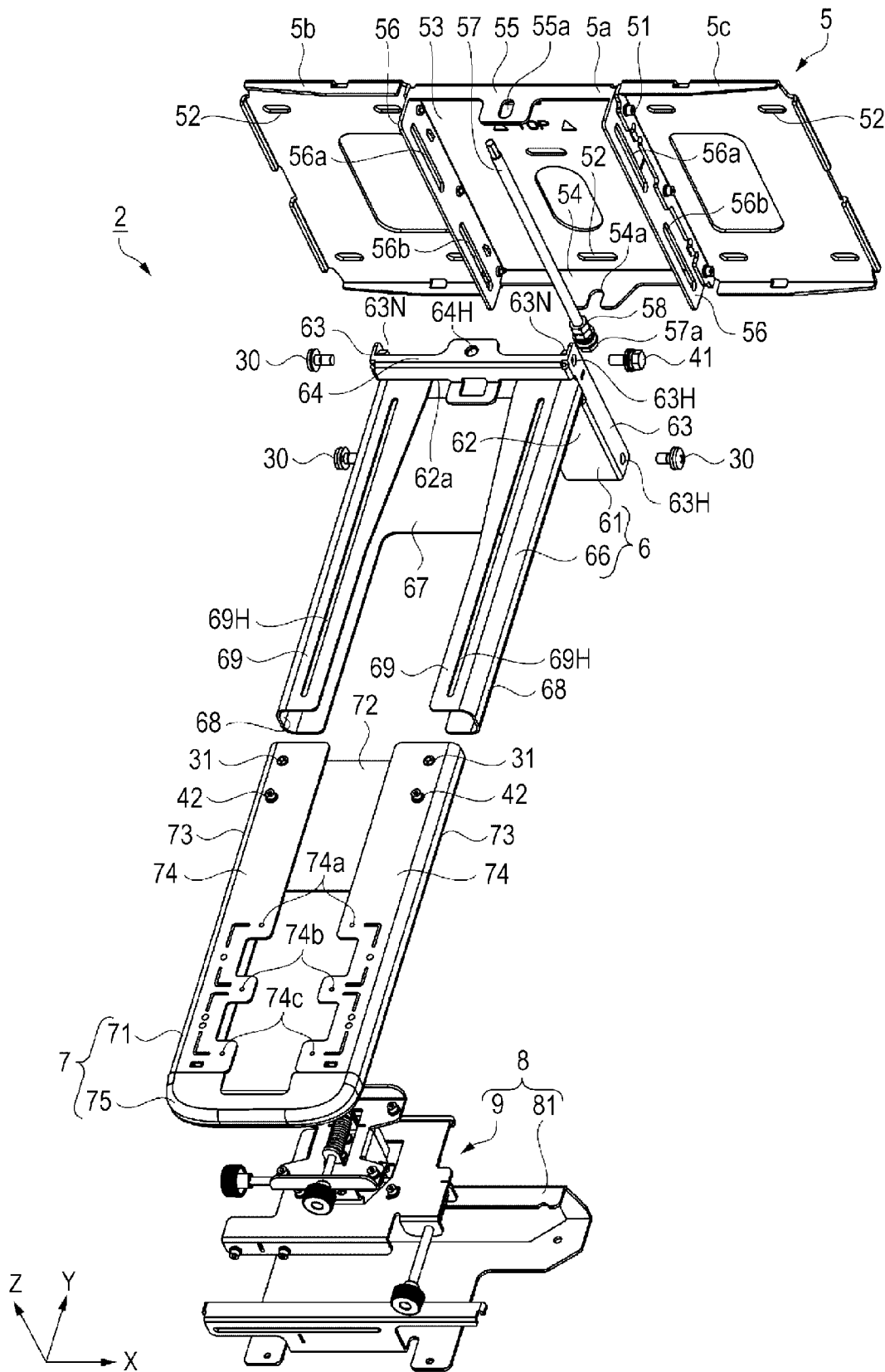
FIG. 4 is a disassembled perspective view of the supporting device.

FIGS. 2 and 3 are perspective views showing the supporting device 2. In FIG. 2, the supporting device 2 supporting the projector 1 is shown. FIG. 4 is an exploded perspective view of the supporting device 2. As shown in FIGS. 2 to 4, the supporting device 2 includes a base section 5, a first arm 6, a second arm 7, and a holding mechanism 8.

The base section 5 is fixed to the wall surface W to support the first arm 6. A driving shaft 57 for lifting and lowering the first arm 6 is attached to the base section 5. In the base section 5, three rectangular members formed of a sheet metal are coupled by screws 51. The base section 5 includes a base section body 5a located in the center, a left side member 5b coupled on the left side of the base section body 5a, and a right side member 5c coupled on the right side of the base section body 5a. Plural holes 52 through which screws (not shown) for respectively fixing the base section body 5a, the left side member 5b, and the right side member 5c to the wall surface W are formed in each of the base section body 5a, the left side member 5b, and the right side member 5c.

The base section body 5a includes a plane section 53 arranged along the wall surface W, i.e., the XZ plane. The upper and lower ends and the left and right ends of the plane section 53 are bent in the −Y direction. In a lower surface section 54 bent at the lower end of the plane section 53, a recess 54a to which the driving shaft 57 is attached is formed. In an upper surface section 55 bent at the upper end of the plane section 53, a through-hole 55a through which the distal end of the driving shaft 57 is inserted is formed.

The driving shaft 57 is an elongated hexagonal bolt. A thread groove (not shown in the figures) is formed in the outer circumference of the shaft. The driving shaft 57 is attached to the base section body 5a such that the distal end of the driving shaft 57 projects from the through-hole 55a of the upper surface section 55 and a head 57a of the driving shaft 57 is located on the lower side of the recess 54a of the lower surface section 54. A nut (a double nut) 58 is screwed with the driving shaft 57 with a predetermined distance apart from the head 57a. The driving shaft 57 is attached to the base section body 5a such that the head 57a and the nut 58 hold the lower surface section 54 therebetween.

In a pair of left and right side sections 56 bent at both the left and right ends of the plane section 53, two long holes 56a and 56b long in the up down direction are provided. The long holes 56a and 56b are provided side by side on a straight line along the up down direction. The long hole 56a is located above the long hole 56b.

The first arm 6 includes a base 61 attached to the base section 5 and an arm supporting section 66 projecting from the base 61 in the −Y direction. The base 61 and the arm supporting section 66 are formed of a sheet metal. The first arm 6 can slide in the up down direction with respect to the base section 5 according to the rotation of the driving shaft 57.

The base 61 includes a base body 62 having a rectangular shape in plan view opposed to the plane section 53 of the base section body 5a and side sections 63 (see FIG. 4) bent in the +Y direction from the left and right ends of the base body 62. A rectangular opening 62a, in which a proximal end of the arm supporting section 66 is arranged, is formed closer to the upper end of the base body 62.

The left and right side sections 63 are formed to be located on the inner side of the left and right side sections 56 of the base section body 5a. In the left and right side sections 63, two holes 63H respectively exposed from the long holes 56a and 56b of the base section body 5a are provided. On the inner side of the left and right side sections 63, nuts 63N are fixed to positions corresponding to the holes 63H. The base 61 includes an upper surface section 64 bent in the +Y direction from the upper end of the base body 62 and a lower surface section 65 (see FIG. 3) bent in the +Y direction from the lower end of the base body 62. In the upper surface section 64 and the lower surface section 65, holes 64H and 65H (the hole 65H is not shown in the figures), through which the driving shaft 57 is inserted. The holes 64H and 65H engage with the thread in the outer circumference of the driving shaft 57.

The arm supporting section 66 is fixed to the base 61 such that one end (the proximal end) is inserted into the opening 62a of the base 61 and the other end (the distal end) projects in the −Y direction. The arm supporting section 66 includes a bottom surface section 67 along the XY plane, standing sections 68 standing in the up direction from both the left and right ends of the bottom surface section 67, and left and right upper surface sections 69 substantially parallel to the bottom surface section 67 and bent from the upper ends of the left and right standing sections 68 in directions in which the upper surface sections 69 come close to each other. Guide holes 69H extending along the front rear direction are formed in the left and right upper surface sections 69.

The first arm 6 is configured as explained above. The first arm 6 is attached to the base section body 5a together with the driving shaft 57 inserted through the holes 64H and 65H of the upper surface section 64 and the lower surface section 65. Guide screws 30 and a fixing screw 41 are inserted through the long holes 56a and 56b of the base section body 5a, whereby the first arm 6 is fixed to the base section body 5a. The guide screws 30 are inserted through the long holes 56a and 56b of the side section 56 on the left side (the −X side) and the long hole 56b on the lower side of the side section 56 on the right side (the +X side). The fixing screw 41 is inserted through the long hole 56a on the upper side of the side section 56 on the right side (the +X side).

Although not shown in detail in the figures, thread grooves are formed on the distal end side of the guide screws 30. Columnar non-screw sections, in which thread grooves are not formed, are provided in the proximal ends on the screw head side. The non-screw sections come into contact with the circumferential edges of the long holes 56a and 56b, whereby the guide screws 30 guide the first arm 6.

When the fixing screw 41 is loosened and the driving shaft 57 is rotated by a wrench or the like, the first arm 6 slides in the up down direction according to the direction of the rotation. When the first arm 6 is slid, the non-screw sections of the guide screws 30 slide against the circumferential edges of the long holes 56a and 56, whereby the first arm 6 smoothly moves. When the fixing screw 41 is tightened, the first arm 6 is fixed in a position to where the first arm 6 is moved.

The second arm 7 includes an arm body 71 made of a sheet metal and a distal end cover 75 made of synthetic resin. The second arm 7 is formed to be capable of sliding in the front rear direction with respect to the first arm 6. The second arm 7 is slid, whereby a projection amount of the second arm 7 with respect to the first arm 6 is changed. The holding mechanism 8 is attached to the second arm 7.

The arm body 71 includes a bottom surface section 72, standing sections 73, and left and right upper surface sections 74 respectively located on the inner side of the bottom surface section 67, the standing sections 68, and the left and right upper surface sections 69 of the arm supporting section 66.

In each of the left and right upper surface sections 74, two screw holes (not shown in the figures), which are exposed from the guide hole 69H of the first arm 6 and in which the guide screw 31 and the fixing screw 42 (see FIG. 4) are screwed, are provided side by side in the front rear direction. Guide screws 31 are screwed in screw holes on the front side (the +Y side) among screw holes, two of which are provided in each of the left and right upper surface sections 74. Fixing screws 42 are screwed in screw holes on the rear side (the −Y side) among the screw holes. In the guide screws 31, as in the guide screws 30, thread grooves are formed on the distal end side and non-thread sections are provided at the proximal ends on the crew head side.

When the second arm 7 is slid, the non-screw sections come into contact with the circumferential edges of the guide holes 69H, whereby the guide screws 31 smoothly guide the second arm 7. The fixing screws 42 fix the second arm 7 slid to a predetermined position.

After the second arm 7 is inserted through the first arm 6, the guide screws 31 and the fixing screws 42 are inserted through from the guide holes 69H and screwed in the screw holes of the upper surface sections 74. In FIG. 4, a state in which the guide screws 31 and the fixing screws 42 are screwed in the screw holes of the upper surface sections 74 in a disassembled state of the second arm 7 and the first arm 6 is shown.

In the left and right upper surface sections 74, three sets of screw holes 74a, 74b, and 74c for attaching the holding mechanism 8 are provided. The screw holes 74a, 74b, and 74c are arrayed from the front side (the +Y side) to the rear side (the −Y side) in this order. A distance between the screw holes 74a and 74b and a distance between the screw holes 74b and 74c are equal.

The distal end cover 75 is a cover member for improving aesthetics and safety of the supporting device 2. The distal end cover 75 is arranged at a −Y side end of the arm body 71.

The second arm 7 is configured as explained above. After being inserted through the first arm 6, the guide screws 31 and the fixing screws 42 are inserted through from the guide holes 69H of the first arm 6, whereby the second arm 7 is fixed to the first arm 6. The fixing screws 42 are loosened, whereby the second arm 7 can slide. As explained above, when the second arm 7 is slid, the non-screw sections of the guide screws 31 slide against the circumferential edges of the guide holes 69H, whereby the second arm 7 smoothly moves. When the fixing screws 42 are tightened, the second arm 7 is fixed to a position where the second arm 7 is moved.

Configuration of the Holding Mechanism

The holding mechanism 8 is fixed to the second arm 7 to support the projector 1. The holding mechanism 8 includes a fixed member 81 fixed to the upper surface 1A of the projector 1 and an adjusting mechanism 9 that couples the fixed member 81 and the second arm 7.

FIGS. 5-A and 5-B are perspective views of the holding mechanism 8. FIG. 5-A is a diagram of the holding mechanism 8 viewed from obliquely above on the right side. FIG. 5-B is a diagram of the holding mechanism 8 viewed from obliquely above on the left side.

As shown in FIGS. 5-A and 5-B, the fixed member 81 is formed of a sheet metal. In order to make it possible to adjust the position in the left right direction of the projector 1, the fixed member 81 is configured to be capable of sliding in the left right direction with respect to the adjusting mechanism 9 in a state in which the fixed member 81 is fixed to the projector 1.

The fixed member 81 includes a bottom surface section 811 formed substantially in parallel to the upper surface 1A (see FIG. 2) of the projector 1, standing sections 812 standing in the up direction from both the front and rear ends of the bottom surface section 811, and front and rear upper surface sections 813 substantially parallel to the bottom surface section 811 and bent from the upper ends of the front and rear standing sections 812 in directions in which the upper surface sections 813 come close to each other. In the bottom surface section 811, plural through-holes 811H corresponding to the screw holes provided in the upper surface 1A of the projector 1 are formed. A long hole 812H along the left right direction (the +/−X direction) is formed in the standing section 812 on the front side (the −Y side).

Fixing screws 44 (see FIG. 2) are inserted through the through-holes 811H of the bottom surface section 811, whereby the fixed member 81 is fixed to the projector 1. The upper surface sections 813 are locked to the adjusting mechanism 9 (a first plate 91 explained below), whereby the fixed member 81 can slide in the left right direction with respect to the adjusting mechanism 9 (the first plate 91). Two fixing screws 43 are inserted through the long hole 812H, whereby the fixed member 81 is fixed to the adjusting mechanism 9 (the first plate 91).

The adjusting mechanism 9 is configured to be capable of adjusting the posture (the tilt) of the projector 1. Specifically, the adjusting mechanism 9 is configured to be capable of performing fine adjustment in a rotating direction about the X axis (up down tilt adjustment), fine adjustment in a rotating direction about the Y axis (horizontal roll adjustment), and fine adjustment in a rotating direction about the Z axis (horizontal rotation adjustment).

The adjusting mechanism 9 includes a first plate 91, a second plate 92, a third plate 93, a rotating mechanism 94, a first shaft 95, a second shaft 96, a third shaft 97, and three coil springs 98. A dial 951, a dial 961, and a dial 971 are respectively attached to ends of the first shaft 95, the second shaft 96, and the third shaft 97.

The first plate 91, the second plate 92, and the third plate 93 are formed of a sheet metal.

As explained above, in the first plate 91, the fixed member 81 is configured to be capable of sliding in the X direction. The first plate 91 includes a flat section 911 to which the upper surface section 813 of the fixed member 81 is locked and a bent section 912 bent downward from the −Y side end of the flat section 911 and located on the inner side of the standing section 812 on the −Y side of the fixed member 81. In the bent section 912, two screw holes (not shown in the figures) exposed from the long hole 812H of the fixed member 81 are formed. The fixed member 81 is fixed by the fixing screws 43.

The second plate 92 is connected below the flat section 911 of the first plate 91 such that the first plate 91 can rotate about the Z axis.

The third plate 93 forms a region on the upper side of the adjusting mechanism 9.

The third plate 93 is fixed to an upper surface section 74 (see FIG. 2) of the second arm 7. The third plate 93 includes a placing section 931 placed on the upper surface section 74, a pair of upper bent sections 932 bent upward from both the front and rear ends of the placing section 931, and a pair of lower bent sections 933 bent downward from both the left and right ends of the placing section 931.

In the placing section 931, two sets of through-holes 93ab and 93bc through which screws are inserted are provided. The through-holes 93ab and 93bc are formed to correspond to two sets of screw holes adjacent to each other among the three sets of screw holes 74a, 74b, and 74c (see FIG. 4) of the second arm 7. In other words, the holding mechanism 8 can be attached to the second arm 7 in a desired position of a position where the screw holes 74a and 74b are exposed from the through-holes 93ab and 93bc (a first attachment position) and a position where the screw holes 74b and 74c are exposed from the through-holes 93ab and 93bc (a second attachment position).

The rotating mechanism 94 is arranged between the pair of lower bent sections 933 of the third plate 93. The rotating mechanism 94 couples the second plate 92 and the third plate 93 such that the second plate 92 can rotate about the X axis and the Y axis with respect to the third plate 93.

Although detailed explanation is omitted, the first shaft 95 is bridged across bent sections provided in the first plate 91 and the second plate 92 with the center axis of the first shaft 95 extending along the Y direction and is arranged to be urged by the coil spring 98. The second shaft 96 is bridged across bent sections provided in the second plate 92 and the rotating mechanism 94 with the center axis of the second shaft 96 extending along the X direction and is arranged to be urged by the coil spring 98. The third shaft 97 is bridged across bent sections provided in the third plate 93 and the rotating mechanism 94 with the center axis of the third shaft 97 extending along the Y direction and is arranged to be urged by the coil springs 98. As explained above, the dials 951, 961, and 971 are respectively attached to the ends of the first shaft 95, the second shaft 96, and the third shaft 97. The user can rotate the first shaft 95, the second shaft 96, and the third shaft 97 by respectively turning the dials 951, 961, and 971.

The holding mechanism 8 is configured as explained above. After the third plate 93 is placed in the first attachment position or the second attachment position of the upper surface section 74 of the second arm 7, the holding mechanism 8 is fixed to the upper surface section 74 of the second arm 7 by the fixing screws 45 (see FIG. 2) inserted through the through-holes 93ab and 93bc.

Adjusting Method for the Supporting Device

Adjusting operation for the supporting device 2 is explained with reference to FIG. 2 and FIGS. 5-A and 5-B.

The user can slide the first arm 6 in the up down direction (the +/−Z direction) with respect to the base section 5 by rotating the driving shaft 57 after loosening the fixing screw 41. In other words, the user can adjust the position of the projector 1 in the +/−Z direction by operating the fixing screw 41 and the driving shaft 57 and can move up and down a projected image, i.e., an image displayed by projection according to the adjustment.

The user can slide the second arm 7 in the front rear direction (the +/−Y direction) with respect to the first arm 6 by loosening the fixing screw 42. In other words, the user can adjust the position of the projector 1 in the +/−Y direction by operating the fixing screws 42 and can change the size of the projected image according to the adjustment. Specifically, when the projector 1 moves forward (a direction toward the screen SC), the projected image is reduced. When the projector 1 moves backward (a direction away from the screen SC), the projected image is expanded.

The user can slide the fixed member 81 in the left right direction (the +/−X direction) with respect to the adjusting mechanism 9 by loosening the fixing screws 43. In other words, the user can adjust the position of the projector 1 in the +/−X direction by operating the fixing screws 43 and move the projected image to the left and right according to the adjustment.

The user can rotate the first plate 91 about the Z axis with respect to the second plate 92 by turning the dial 951. The projector 1 also rotates about the Z axis together with the fixed member 81 fixed to the first plate 91, whereby horizontal rotation adjustment for the projector 1 is performed. In other words, the user can adjust the angle (the tilt) around the Z axis of the projector 1 by operating the dial 951 and correct trapezoidal distortion in the left right direction of the projected image according to the adjustment.

The user can rotate the first plate 91 and the second plate 92 about the Y axis with respect to the rotating mechanism 94 by turning the dial 961. The projector 1 also rotates about the Y axis together with the fixed member 81 fixed to the first plate 91, whereby horizontal roll adjustment for the projector 1 is performed. In other words, the user can adjust the angle (the tilt) around the Y axis of the projector 1 by operating the dial 961 and correct the rotation (the tilt) of the projected image in the screen SC according to the adjustment.

The user can rotate the first plate 91 and the second plate 92 about the X axis with respect to the rotating mechanism 94 by turning the dial 971. The projector 1 rotates about the X axis together with the fixed member 81 fixed to the first plate 91, whereby vertical tilt adjustment for the projector 1 is performed. In other words, the user can adjust the angle (the tilt) around the X axis of the projector 1 by operating the dial 971 and correct trapezoidal distortion in the up down direction of the projected image according to the adjustment.

As explained above, the supporting device 2 can adjust, as adjustment items related to the supporting state of the projector 1, six adjustment items, i.e., the position in the +/−X direction, the position in the +/−Y direction, the position in the +/−Z direction, the angle around the X axis, the angle around the Y axis, and the angle around the Z axis. The user can adjust the adjustment items by operating the fixing screws 41, 42, and 43, the driving shaft 57, and the dials 951, 961, and 971. Therefore, the fixing screws 41, 42, and 43, the driving shaft 57, and the dials 951, 961, and 971 are equivalent to adjustment operation sections for adjusting the supporting state such as the position and the angle of the projector 1. Specifically, the fixing screw 41 and the driving shaft 57 are equivalent to an adjustment operation section for adjusting the position in the +/−Z direction, the fixing screws 42 are equivalent to an adjustment operation section for adjusting the position in the +/−Y direction, and the fixing screws 43 are equivalent to an adjustment operation section for adjusting the position in the +/−X direction. The dial 951 is equivalent to an adjustment operation section for adjusting the angle around the Z axis, the dial 961 is equivalent to an adjustment operation section for adjusting the angle abound the Y axis, and the dial 971 is equivalent to an adjustment operation section for adjusting the angle around the X axis.

Configuration of the Projector

Figure 6:
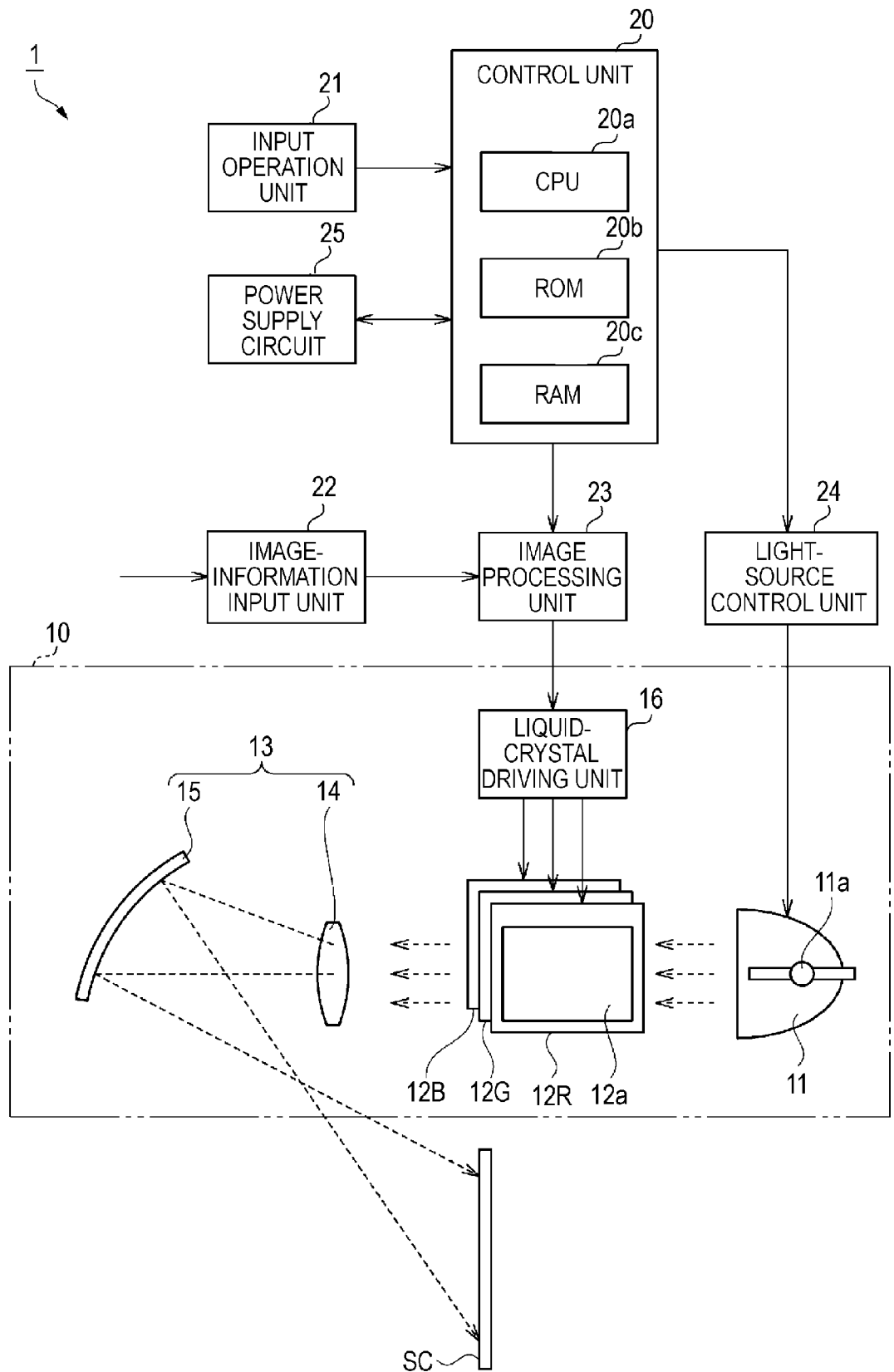
FIG. 6 is a block diagram showing a schematic configuration of a projector.

The configuration of the projector 1 is explained.
FIG. 6 is a block diagram showing a schematic configuration of the projector 1.

As shown in FIG. 6, the projector 1 includes a projecting unit 10, a control unit 20, an input operation unit 21, an image-information input unit 22, an image processing unit 23, a light-source control unit 24, and a power supply circuit 25.

The projecting unit 10 includes a light source device 11 functioning as a light source, three liquid crystal light valves 12R, 12G, and 12B functioning as light modulating devices, a projection optical device 13, and a liquid-crystal driving unit 16. The projecting unit 10 modulates light emitted from the light source device 11 with the liquid crystal light valves 12R, 12G, and 12B, projects the light with the projection optical device 13, and displays an image on the screen SC.

The light source device 11 includes a light source lamp 11a of a discharge type including an extra-high pressure mercury lamp or a metal halide lamp. Light emitted from the light source device 11 is converted into light having a substantially uniform luminance distribution by a not-shown integrator optical system, separated into respective color light components of red (R), green (G), and blue (B), which are the three primary colors of light, by a not-shown color separation optical system, and then respectively made incident on the liquid crystal light valves 12R, 12G, and 12B.

The liquid crystal light valves 12R, 12G, and 12B include transmissive liquid crystal panels in each of which liquid crystal is encapsulated between a pair of transparent substrates. The liquid crystal light valves 12R, 12G, and 12B include rectangular pixel regions 12a on each of which plural pixels (not shown in the figure) are arrayed in a matrix shape. The liquid crystal light valves 12R, 12G, and 12B can apply a driving voltage to the liquid crystal for each of the pixels. When the liquid-crystal driving unit 16 applies driving voltages corresponding to input image information to the pixels, the pixels are set to light transmittance corresponding to the image information. Therefore, light emitted from the light source device 11 is transmitted through the pixel regions 12a of the liquid crystal light valves 12R, 12G, and 12B to thereby be modulated for each of the color lights according to the image information. The modulated color lights are combined by a not-shown color combination optical system.

The projection optical device 13 includes a lens 14 and a concave mirror 15 functioning as a reflecting unit. The projection optical device 13 increases, with the concave mirror 15, the angle of light modulated by the liquid crystal light valves 12R, 12G, and 12B and projects the light on the screen SC.

The control unit 20 includes a CPU (Central Processing Unit) 20a, a nonvolatile ROM (Read Only Memory) 20b functioning as a storing unit having stored therein control programs, setting data, and the like, and a RAM (Random Access Memory) 20c used for temporary storage of data. The control unit 20 functions as a computer. The CPU 20a executes the control program stored in the ROM 20b and performs arithmetic processing while temporarily storing necessary information in the RAM 20c to thereby control the operation of the projector 1. In the ROM 20b, image information (guide image information) for displaying a guide image Pg (see FIG. 8) used in setting the projector 1 is stored.

The input operation unit 21 receives input operation of the user and includes plural operation keys for the user to give various instructions to the projector 1. When the user operates any one of the operation keys of the input operation unit 21, the input operation unit 21 receives the operation and outputs a control signal corresponding to the operated operation key to the control unit 20. When the control signal is input from the input operation section 21, the control section 20 performs processing based on the input control signal and controls the operation of the projector 1. The projector 1 can includes a remote controller that can be remotely operated. In this case, the remote controller is also equivalent to the input operation unit 21. When the remote controller receives input operation of the user and transmits an operation signal of an infrared ray corresponding to operation content to the main body of the projector 1, a not-shown receiving unit receives the operation signal and transmits the operation signal to the control unit 20.

The image-information input unit 22 includes plural input terminals. Image information of various formats is input to the input terminals from not-shown external image supplying apparatuses such as a video player and a personal computer. The image-information input unit 22 outputs the input image information to the image processing unit 23.

The image processing unit 23 converts the image information input from the image-information input unit 22 into image information representing the gradations of the pixels of the liquid crystal light valves 12R, 12G, and 12B, i.e., image information for specifying driving voltages applied to the pixels. The converted image information includes plural pixel values corresponding to the pixels of the liquid crystal light valves 12R, 12G, and 12B. The pixel value sets light transmittance of the pixel corresponding to the pixel value. The luminance of light emitted from the pixel is specified by the pixel value. Further, the image processing unit 23 performs, on the basis of an instruction of the control unit 20, for example, image quality adjustment processing for adjusting image quality such as brightness, contrast, sharpness, and tint to the converted image information and outputs image information after the processing to the liquid-crystal driving unit 16.

The image processing unit 23 can output the guide image information stored in the ROM 20b to the liquid-crystal driving unit 16 instead of the image information. When the control unit 20 outputs the guide image information to the image processing unit 23 and instructs the image processing unit 23 to display the guide image Pg, the image processing unit 23 outputs the input guide image information to the liquid-crystal driving unit 16 and causes the projecting unit 10 to project light corresponding to the guide image Pg. In this way, the image processing unit 23 can switch, according to the instruction from the control unit 20, a state in which an image (an input image) based on the image information input from the image-information input unit 22 is displayed and a state in which the guide image Pg based on the guide image information is displayed.

When the liquid-crystal driving unit 16 drives the liquid crystal light valves 12R, 12G, and 12B according to the image information input from the image processing unit 23, the light emitted from the light source device 11 is modulated by the liquid crystal light valves 12R, 12G, and 12B according to the image information and projected from the projection optical device 13.

The light-source control unit 24 controls lighting of the light source device 11 (the light source lamp 11a) on the basis of an instruction of the control unit 20. Specifically, the light-source control unit 24 can turn on the light source lamp 11a by supplying predetermined electric power to the light source lamp 11a and turn off the light source lamp 11a by stopping the supply of the electric power.

A commercial power (not shown in the figure) of AC 100 V or the like is supplied to the power supply circuit 25 from the outside. The power supply circuit 25 converts the commercial power (alternating-current power) into direct-current power having a predetermined voltage and supplies electric power to the units of the projector 1 (supply paths to the units are not shown in the figure). The power supply circuit 25 can switch, on the basis of an instruction of the control unit 20, a state in which the power supply circuit 25 supplies electric power necessary for projection of light (operating power) to the unit (a state of power-on) and a state in which the power supply circuit 25 stops the supply of the operating power and stands by for operation for turning on the power supply (a standby state).

Operation of the Projector

When the commercial power is supplied to the projector 1, the power supply circuit 25 supplies standby power to at least the control unit 20 and the input operation unit 21. The control unit 20 receives the power supply and starts an operation conforming to the control program. Immediately after the commercial power is supplied, the projector 1 is in the standby state (also referred to as "a power-off state"). The projector 1 stands by for operation for turning on the power supply (ON operation) in a state in which the light source lamp 11a is turned off.

Figure 7:
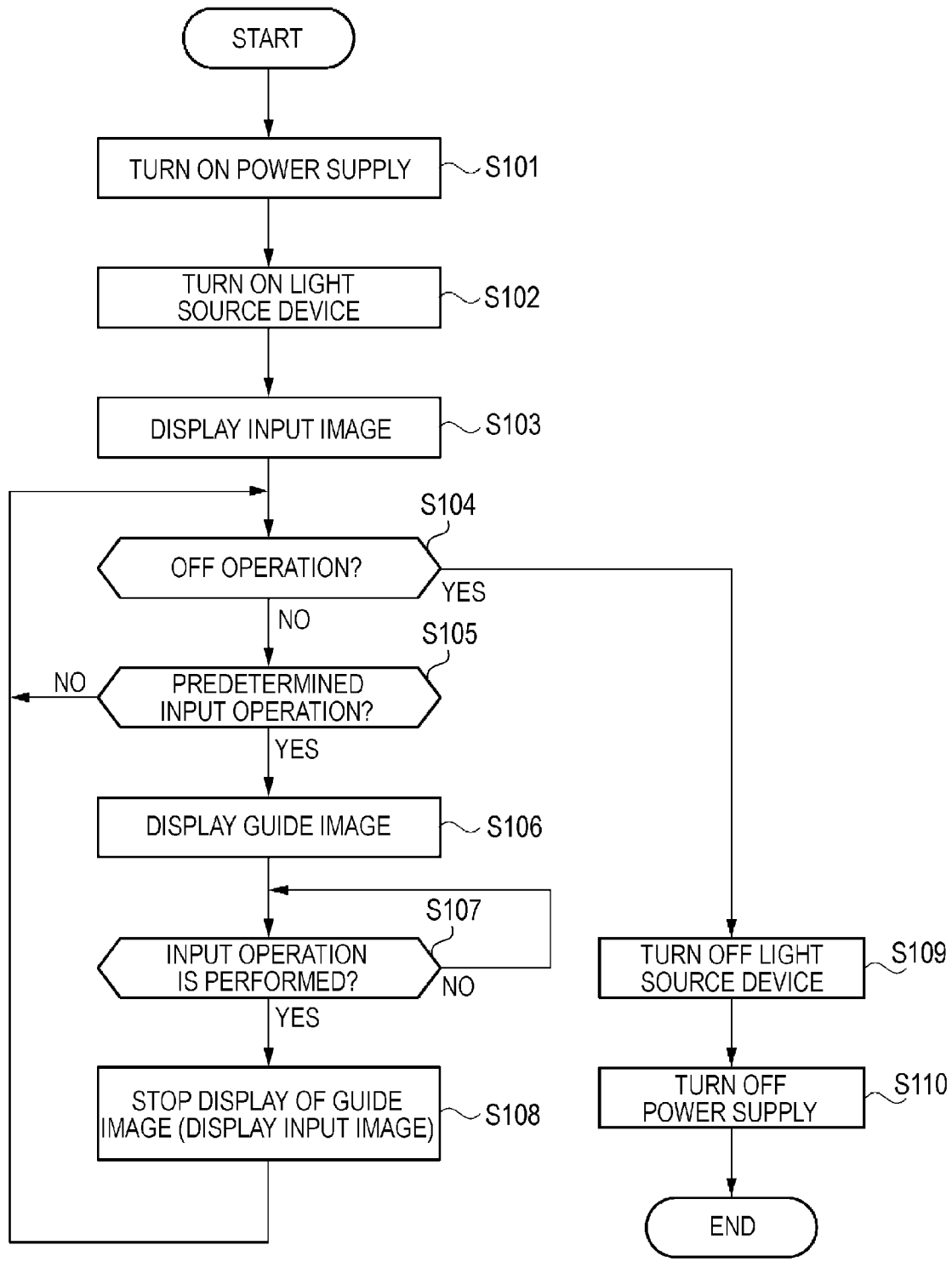
FIG. 7 is a flowchart for explaining the operation of the projector performed when a power supply is on in a first embodiment.

FIG. 7 is a flowchart for explaining the operation of the projector 1 performed when the power supply is on. When the user performs the ON operation in the standby state, the control unit 20 operates according to a flow shown in FIG. 7.

As shown in FIG. 7, in step S101, the control unit 20 instructs the power supply circuit 25 to start the supply of the operating power to the units of the projector 1 and turns on the power supply for the projector 1.

In step S102, the control unit 20 instructs the light-source control unit 24 to turn on the light source device 11 (the light source lamp 11a). In step S103, the control unit 20 instructs the image processing unit 23 to perform image processing for image information input to the image-information input unit 22 and display an input image based on the image information. As a result, light corresponding to the image information is projected from the projecting unit 10 and the input image is displayed on the screen SC.

In step S104, the control unit 20 determines whether operation for turning off the power supply (OFF operation) is performed on the input operation unit 21. When the OFF operation is not performed, the control unit 20 shifts to step S105. When the OFF operation is performed, the control unit 20 shifts to step S109.

When the OFF operation is not performed and the control unit 20 shifts to S105, the control unit 20 determines whether predetermined input operation for displaying the guide image Pg is performed on the input operation unit 21. When the predetermined input operation is performed, the control unit 20 shifts to step S106. When the predetermined input operation is not performed, the control unit 20 returns to step S104.

When the predetermined input operation is performed and the control unit 20 shifts to S106, the control unit 20 outputs guide image information to the image processing unit 23 and instructs the image processing unit 23 to display the guide image Pg. The image processing unit 23 outputs the guide image information to the liquid-crystal driving unit 16 according to the instruction of the control unit 20. Then, light corresponding to the guide image information is projected from the projecting unit 10 and the guide image Pg is displayed on the screen SC.

Figure 8:
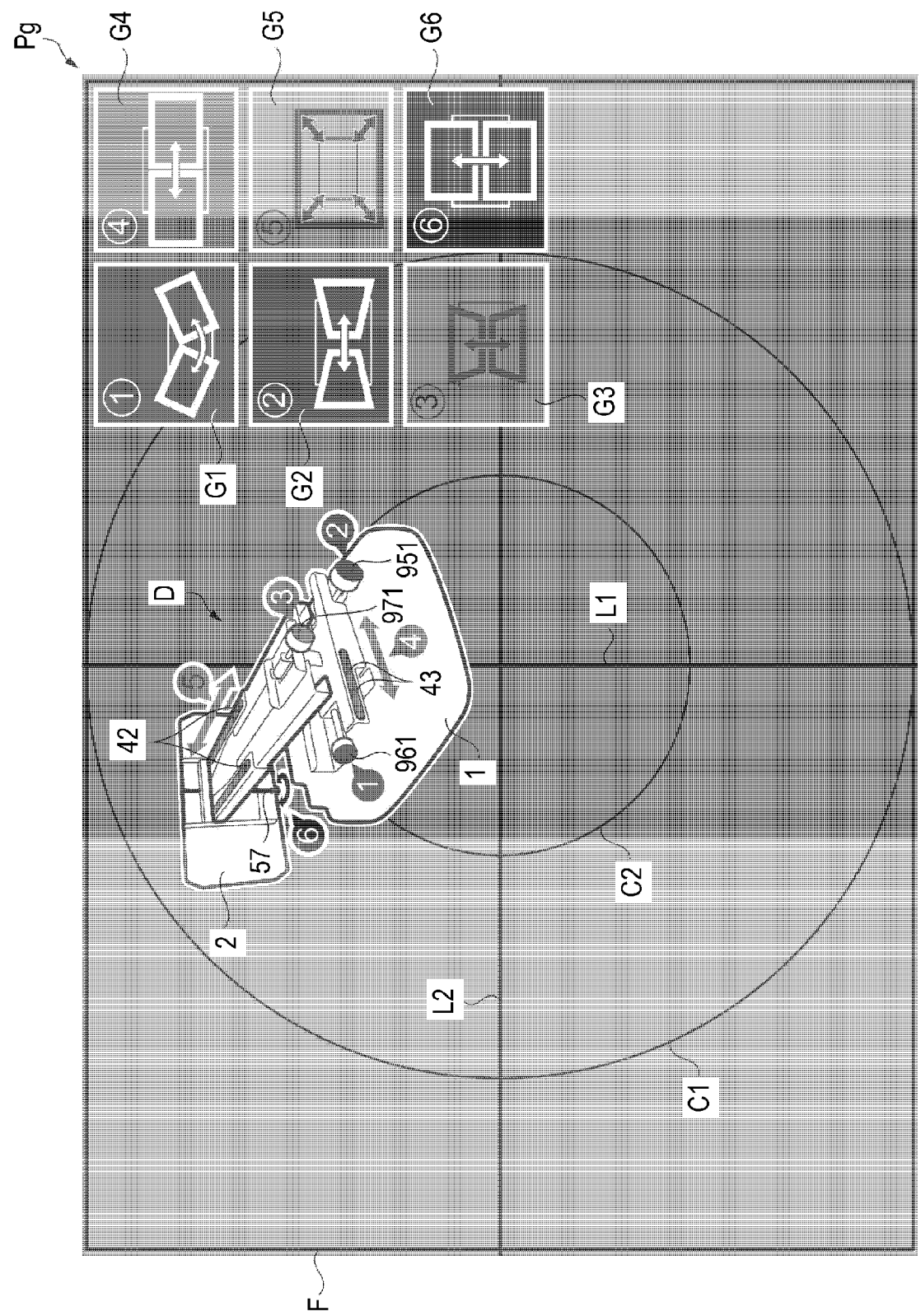
FIG. 8 is a diagram showing a guide image.

FIG. 8 is a diagram showing the guide image Pg.

As shown in FIG. 8, the guide image Pg is a rectangular image formed in the entire region of the image pixel region 12a. The guide image Pg includes a rectangular frame F formed along the outer periphery, longitudinal and lateral two center lines L1 and L2, and two circles (concentric circles) C1 and C2 having different diameters. The center of the two circles C1 and C2 coincides with the center of the guide image Pg, i.e., the intersection of the two center lines L1 and L2. The C1 having the larger diameter is in contact with the upper and lower lines of the frame F. In a region above the center of the guide image Pg, a perspective view D representing the projector 1 and the supporting device 2 supporting the projector 1 is drawn. In a region on the upper right of the guide image Pg, six illustrations G1 to G6 affixed with numbers (numerals) 1 to 6 are included.

The frame F, the center lines L1 and L2, and the circles C1 and C2 are figures (test patterns) for making it easy to recognize the tilt and the deformation (distortion) of a projected image corresponding to a supporting state of the projector 1. The user can adjust a setting state of the projector 1 and a supporting state by the supporting device 2 with reference to the shapes, the sizes, the tilts, and the like of the figures.

The six illustrations G1 to G6 respectively correspond to six adjustment items related to the supporting state of the projector 1 and represent how a projected image changes when the respective adjustment items are adjusted.

Specifically, the first illustration G1 represents a change (a change in the tilt) of the projected image that occurs when the projector 1 is rotated around the Y axis. The second illustration G2 represents a change (a change in the shape) of the projected image that occurs when the projector 1 is rotated around the Z axis. The third illustration G3 represents a change (a change in the shape) of the projected image that occurs when the projector 1 is rotated around the X axis. The fourth illustration G4 represents a change (a change in the position) of the projected image that occurs when the projector 1 is slid in the +/−X direction. The fifth illustration G5 represents a change (a change in the size) of the projected image that occurs when the projector 1 is slid in the +/−Y direction. The sixth illustration G6 represents a change (a change in the position) of the projected image that occurs when the projector 1 is slid in the +/−Z direction.

The six illustrations G1 to G6 are respectively colored in different colors. Specifically, the illustrations G1 to G6 are respectively surrounded by frames and the backgrounds of the illustrations G1 to G6 on the inner side of the frames are respectively colored in different colors. The background colors of the illustrations G1 to G6 are colors that characterize the illustrations G1 to G6 most. Therefore, in this specification, the background colors are also expressed as "colors of illustrations".

The perspective view D is an explanatory diagram for clearly showing the positions of the adjustment operation units that adjust the six adjustment items of the supporting device 2 and indicating correspondence between the adjustment operation units and the adjustment items (the illustrations G1 to G6). In the perspective view D, the numbers 1 to 6 are affixed near the respective adjustment operation units in balloons. The numbers correspond to the numbers affixed to the illustrations G1 to G6. In other words, the numbers same as the numbers of the illustrations G1 to G6 representing the adjustment items of the adjustment operation units are respectively affixed to the adjustment operation units on the perspective view D. The correspondence between the adjustment operation units and the adjustment items (the illustrations G1 to G6) is indicated by the numbers. Specifically, the number 1 indicating the adjustment operation unit for adjusting the angle around the Y axis is affixed to the dial 961. The number 2 indicating the adjustment operation unit for adjusting the angle around the Z axis is affixed to the dial 951. The number 3 indicating the adjustment operation unit for adjusting the angle around the X axis is affixed to the dial 971. The number 4 indicating the adjustment operation unit for adjusting the position in the +/−X direction is affixed to the fixing screws 43. The number 5 indicating the adjustment operation unit for adjusting the position in the +/−Y direction is affixed to the fixing screws 42. The number 6 indicating the adjustment operation unit for adjusting the position in the +/−Z direction is affixed to the driving shaft 57.

On the perspective view D, the adjustment operation units (the dials 951, 961, and 971, the driving shaft 57, and the fixing screws 42 and 43) are respectively colored in the same colors as the colors (the background colors) of the illustrations G1 to G6 corresponding to the adjustment operation units. The backgrounds (the insides of the balloons) of the numbers affixed to the adjustment operation units are also respectively colored in the same colors as the colors (the background colors) of the illustrations G1 to G6. Therefore, the user can recognize the correspondence between the adjustment operation units and the adjustment items with not only the numbers (numerals) but also the colors.

The guide image Pg is formed as explained above. Therefore, by recognizing the correspondence between the adjustment operation units and the illustrations G1 to G6 with the numbers and the colors, the user can easily grasp which adjustment operation unit the user should operate to adjust which adjustment item. Since the fixing screws 42 and 43 are small and inconspicuous, regions around the fixing screws 42 and 43 (regions on the insides of the guide hole 69H and the long hole 812H) are also colored in the same colors as the fixing screws 42 and 43 to clearly show the positions of the fixing screws 42 and 43. Arrows representing operation directions and moving directions are affixed near the driving shaft 57 and the fixing screws 42 and 43. The arrows are colored in the same colors as the numbers.

The numbers affixed to the illustrations G1 to G6 and in the perspective view D represent the order in performing the adjustment operation and indicate that the adjustment operation should be performed in the order conforming to the number. In this embodiment, the operation (first to third) for adjusting the angle of the projector 1 is performed earlier than the operation (fourth to sixth) for adjusting the position of the projector 1. This is because, since the position of a displayed image changes according to the adjustment of the angle of the projector 1, even if the adjustment of the position is performed earlier, the position needs to be adjusted again after the adjustment of the angle and work efficiency is deteriorated.

The adjustment work for the supporting state may be performed by one operator or may be shared by two operators. When the adjustment work is shared by the two operators, one operator (a first operator) checks a state (the position and a deficiency) of the displayed guide image Pg in a remote position and the other operator (a second operator) mounts a stepladder or the like under the projector 1 and performs adjustment operation according to an instruction of the first operator. Then, the operators can efficiently perform the work. The first operator can indicate the adjustment item, which should be adjusted, to the second operator using the number or the color. Therefore, operability is further improved. If the second operator performs the work in a position shifted to the left side of a position right under the projector 1 and the supporting device 2, both the operators can visually recognize the six illustrations G1 to G6 arranged on the right side. If it is easier to perform the adjustment operation in a position shifted to the right side of the position right under the projector 1 and the supporting device 2, the guide image Pg in which the illustrations G1 to G6 are arranged on the left side only has to be prepared.

Referring back to FIG. 7, in step S107, the control unit 20 determines whether some input operation is performed on the input operation unit 21, i.e., any one of the operation keys of the input operation unit 21 is operated. When input operation is performed, the control unit 20 shifts to step S108. When input operation is not performed, the control unit 20 repeats step S107.

When some input operation is performed and the control unit 20 shifts to step S108, the control unit 20 instructs the image processing unit 23 to stop the display of the guide image Pg and return to the state for displaying an input image. The control unit 20 returns to step S104.

When the OFF operation is performed in step S104 and the control unit 20 shifts to step S109, the control unit 20 instructs the light-source control unit 24 to turn off the light source device 11 (the light source lamp 11a). In step S110, the control unit 20 instructs the power supply circuit 25 to stop the supply of the operating power to the units and turns off the power supply for the projector 1. In other words, the control unit 20 shifts the projector 1 to the standby state and ends the flow.

As explained above, with the image display apparatus 100 according to this embodiment, it is possible to obtain effects explained below.

(1) With the image display apparatus 100 according to this embodiment, since the supporting device 2 that supports the projector 1 includes the plural adjustment operation units (the fixing screws 41, 42, and 43, the driving shaft 57, and the dials 951, 961, and 971) for adjusting a supporting state and the projector 1 displays the guide image Pg for guiding the adjustment of the supporting state by the adjustment operation units, the user can adjust the supporting state while looking at the displayed guide image Pg and easily perform adjustment operation during setting of the projector 1.

(2) With the image display apparatus 100 according to this embodiment, since the guide image Pg includes the perspective view D for clearly showing the positions of the adjustment operation units, the user can easily recognize the position of the adjustment operation unit that the user should operate.

(3) With the image display apparatus 100 according to this embodiment, since the guide image Pg indicates the correspondence between the adjustment operation units and the adjustment items using the perspective view D and the illustrations G1 to G6, the user can easily recognize which adjustment operation unit the user should operate to adjust which adjustment item.

(4) With the image display apparatus 100 according to this embodiment, since the guide image Pg includes the illustrations G1 to G6 representing the adjustment items and the correspondence between the adjustment operation units and the illustrations G1 to G6 is indicated by the numbers (numerals) and the colors, the user can sensorially recognize the adjustment items associated with the adjustment operation units.

(5) With the image display apparatus 100 according to this embodiment, since the illustrations G1 to G6 represent the changes of the projected image that occur when the adjustment items are adjusted, when the user performs adjustment while looking at the projected image, the user can easily recognize the adjustment item that the user should adjust.

(6) With the image display apparatus 100 according to this embodiment, since the same numbers (numerals) are affixed to both of the adjustment operation units in the perspective view D and the illustrations G1 to G6 corresponding to the adjustment operation units, the user can easily recognize the correspondence between the adjustment operation units and the illustrations G1 to G6.

(7) With the image display apparatus 100 according to this embodiment, since the numbers affixed to the adjustment operation units in the perspective view D and the illustrations G1 to G6 represent the order in performing the adjustment of a supporting state, the user can easily recognize an operation procedure for the adjustment.

(8) With the image display apparatus 100 according to this embodiment, since the numbers affixed in the perspective view D and the illustrations G1 to G6 are colored in the same colors, the user can more easily recognize the correspondence between the adjustment operation units and the illustrations G1 to G6.

(9) With the image display apparatus 100 according to this embodiment, since the adjustment operation units shown in the perspective view D and the illustrations G1 to G6 are colored in the same colors, the user can more easily recognize the correspondence between the adjustment operation units and the illustrations G1 to G6.

(10) With the image display apparatus 100 according to this embodiment, since the test patterns (the frame F, the center lines L1 and L2, and the circles C1 and C2) for making it easy to recognize the tilt and the deformation (distortion) of a projected image corresponding to a supporting state of the projector 1 are included in the guide image Pg, the user can more easily adjust the supporting state.

(11) With the image display apparatus 100 according to this embodiment, since the projector 1 is switched to the state for displaying the guide image Pg if the predetermined input operation is performed in a state in which an input image is displayed, the user can easily start the adjustment work.

In this embodiment, the control unit 20 and the image processing unit 23 in displaying the guide image pg are equivalent to a guide display unit.

Second Embodiment

An image display apparatus according to a second embodiment is explained below with reference to the accompanying drawings.

The image display apparatus 100 according to this embodiment has substantially the same configuration as the first embodiment except the operation of the projector 1. Information (guide image display information) indicating whether the guide image Pg is automatically displayed during the startup of the projector 1 is stored in the ROM 20b of the projector 1 according to this embodiment. The projector 1 displays the guide image Pg when the guide image display information is ON and does not display the guide image Pg when the guide image display information is OFF.

Figure 9:
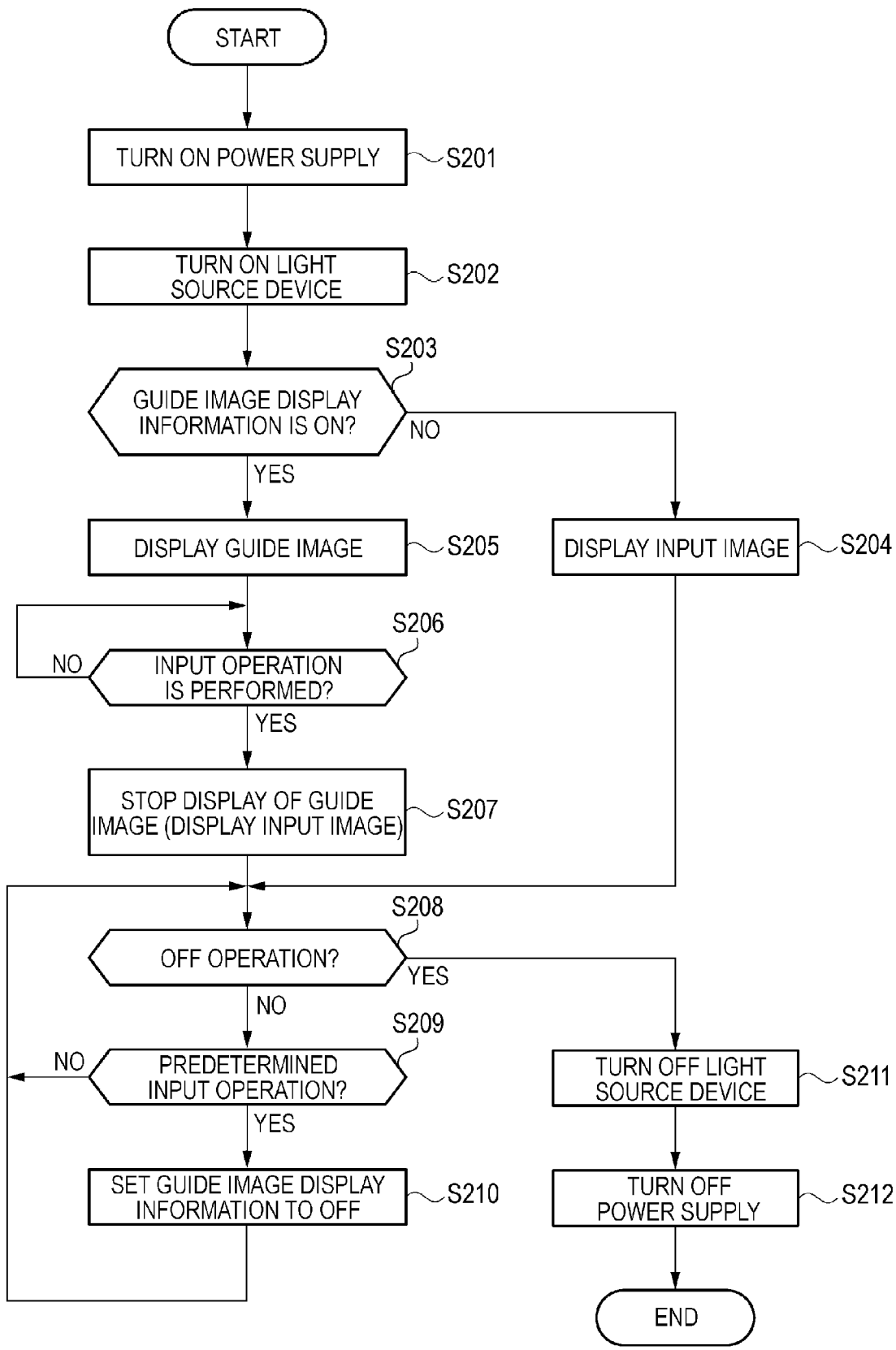
FIG. 9 is a flowchart for explaining the operation of a projector performed when a power supply is on in a second embodiment.

FIG. 9 is a flowchart for explaining the operation of the projector 1 performed when the power supply is on. When the ON operation is performed by a user in the standby state, the control unit 20 operates according to a flow shown in FIG. 9.

As shown in FIG. 9, in step S201, the control unit 20 instructs the power supply circuit 25 to start the supply of operating power to the units of the projector 1 and turns on the power supply for the projector 1.

In step S202, the control unit 20 instructs the light-source control unit 24 to turn on the light source device 11 (the light source lamp 11a).

In step S203, the control unit 20 reads out the guide image display information stored in the ROM 20b and determines whether the guide image display information is ON or OFF, i.e., whether the guide image Pg is automatically displayed.

When the guide image display information is ON, the control unit 20 shifts to step S205. When the guide image display information is OFF, the control unit 20 shifts to step S204.

When the guide image display information is OFF and the control unit 20 shifts to step S204, the control unit 20 instructs the image processing unit 23 to perform image processing for image information input to the image-information input unit 22 and display an input image based on the image information. The control unit 20 shifts to step S208. As a result, light corresponding to the image information is projected from the first projecting unit 10. The input image is displayed on the screen SC.

On the other hand, when the guide image display information is ON and the control unit 20 shifts to step S205, the control unit 20 outputs guide image information to the image processing unit 23 and instructs the image processing unit 23 to display the guide image Pg. When the image processing unit 23 outputs the guide image information to the liquid-crystal driving unit 16 according to the instruction of the control unit 20, light corresponding to the guide image information is projected from the projecting unit 10 and the guide image Pg is displayed on the screen SC.

In step S206, the control unit 20 determines whether some input operation is performed on the input operation unit 21, i.e., whether any one of the operation keys of the input operation unit 21 is operated. When input operation is performed, the control unit 20 shifts to step S207. When input operation is not performed, the control unit 20 repeats step S206.

When some input operation is performed and the control unit 20 shifts to step S207, the control unit 20 instructs the image processing unit 23 to stop the display of the guide image Pg and return to the state for displaying an input image. The control unit 20 shifts to step S208.

In step S208, the control unit 20 determines whether OFF operation for turning off the power supply is performed on the input operation unit 21. When the OFF operation is not performed, the control unit 20 shifts to step S209. When the OFF operation is performed, the control unit 20 shifts to step S211.

When the OFF operation is not performed and the control unit 20 shifts to step S209, the control unit 20 determines whether predetermined input operation for setting the guide image display information to OFF is performed. When the predetermined input operation is performed, the control unit 20 shifts to step S210. When the predetermined input operation is not performed, the control unit 20 returns to step S208.

When the predetermined input operation is performed and the control unit 20 shifts to step S210, the control unit 20 sets the guide image display information to OFF and stores the guide image display information in the ROM 20b. The control unit 20 returns to step S208. Consequently, when the projector 1 is started next time, the guide image Pg is not automatically displayed.

When the OFF operation is performed in step S208 and the control unit 20 shifts to step S211, the control unit 20 instructs the light-source control unit 24 to turn off the light source device 11 (the light source lamp 11a). In step S212, the control unit 20 instructs the power supply circuit 25 to stop the supply of the operating power to the units and turns off the power supply for the projector 1. In other words, the control unit 20 shifts the projector 1 to the standby state and ends the flow.

As explained above, with the projector 1 according to this embodiment, it is possible to obtain effects explained below.

With the projector 1 according to this embodiment, since the guide image Pg is automatically displayed during the startup of the projector 1 (turn-on of the power supply) when the guide image display information stored in the ROM 20b is ON, it is possible to efficiently perform adjustment work for the supporting device 2. Since the guide image display information can be set to OFF by performing the predetermined input operation, when the adjustment of the supporting device 2 is completed and readjustment is not planned, the guide image Pg can be set not to be automatically displayed during the startup of the projector 1. In particular, if the guide image display information is set to ON during the shipment of the projector 1, the guide image Pg can be automatically displayed when an operator starts the projector 1 for the first time. It is possible to efficiently perform the adjustment work for the supporting device 2.

Modifications

The embodiments may be modified as explained below.

In the embodiments, the numbers (numerals) are affixed to the illustrations G1 to G6 and in the perspective view D. However, other signs such as alphabets may be used.

In the embodiments, the guide image Pg is displayed to perform adjustment in the order of the number 1 to the number 6. However, the guide image Pg may be displayed as two sets of operation (the number 1 to the number 3) for adjusting the angle of the projector 1 and operation (the number 4 to the number 6) for adjusting the position of the projector 1. This is because, although the adjustment of the angle of the projector 1 needs to be performed earlier than the adjustment of the position of the projector 1, the order of the three kinds of adjustment of each of the angle and the position does not substantially affect the adjustment even if the order is changed.

In the embodiments, the supporting device 2 fixed to the wall surface W is explained. However, the invention can also be applied to a supporting device fixed to the ceiling or the floor.

In the embodiments, the 3 CCD projector 1 including the three liquid light valves 12R, 12G, and 12B is explained. However, the invention is not limited to this. For example, the invention can also be applied to a 1 CCD projector that can modulate R light, G light, and B light with one liquid crystal light valve.

In the embodiments, the transmissive liquid crystal light valves 12R, 12G, and 12B are used as the light modulating devices. However, a reflective light modulating device such as a reflective liquid crystal light valve can also be used. Further, a micro mirror array device or the like can also be used that modulates light emitted from a light source by controlling an emitting direction of incident light for each of micro mirrors functioning as pixels.

In the embodiments, the light source device 11 includes the light source lamp 11a of the discharge type. However, a solid-state light source such as an LED (Light Emitting Diode) light source or other light sources can also be used.

The entire disclosure of Japanese Patent Application No. 2011-181299, filed Aug. 23, 2011 is expressly incorporated by reference herein.

REFERENCE SIGNS LIST 1 projector
2 supporting device
5 base section
6 first arm
7 second arm
8 holding mechanism
9 adjusting mechanism
10 projecting unit 20 control unit
21 input operation unit
22 image-information input unit
23 image processing unit
24 light-source control unit
25 power supply circuit
41, 42, 43 fixing screws
57 driving shaft
951, 961, 971 dials
100 image display apparatus
Pg guide image
F frame
L1, L2 center lines
C1, C2 circles
G1, G2, G3, G4, G5, G6 illustrations
D perspective view
SC screen

The invention claimed is:

1. A projector comprising:
a supporting device including a plurality of adjustment operation units for adjusting a supporting state of the projector;
a projecting unit configured to project light modulated according to image information and display an image; and
a guide display unit configured to project a guide image for guiding the adjustment by the plurality of adjustment operation units to be displayed with the image to the projecting unit,
wherein the guide image includes an explanatory diagram for clearly showing the positions of the plurality of adjustment operation units,
wherein the guide image includes a plurality of illustrations that represent changes of a projected image that occur when the adjustment items are adjusted, and
wherein the guide image indicates correspondence between the positions of the plurality of adjustment operation units and the plurality of illustrations.

2. The projector according to claim 1, wherein, in the guide image, signs representing order in performing the adjustment of the supporting state are affixed to the plurality of adjustment operation units shown in the explanatory diagram and the illustrations corresponding to the adjustment operation units.

3. The projector according to claim 1, wherein the guide display unit generates a test pattern to recognize the supporting state of the projector.

4. The projector according to claim 1, further comprising:
a storing unit configured to store information representing whether the guide image is automatically displayed; and
a control unit configured to read out the information from the storing unit during startup and perform control based on the information.

5. An image display apparatus comprising:
the projector according to claim 1; and
a supporting device configured to support the projector.

6. The projector according to claim 1, wherein the plurality of illustrations represent an order for performing the adjustment of the supporting state.

7. A projector comprising:
a supporting device including a plurality of adjustment operation units for adjusting a supporting state of the projector;
a projecting unit configured to project light modulated according to image information and display an image; and
a guide display unit configured to project a guide image for guiding the adjustment by the plurality of adjustment operation units to be displayed with the image to the projecting unit, and to project a test pattern to recognize the supporting state of the projector to the projecting unit,
wherein the guide display unit is configured to overlap between the guide image and the test pattern.

* * * * *